(12) United States Patent
Yu

(10) Patent No.: US 10,852,943 B2
(45) Date of Patent: Dec. 1, 2020

(54) MOBILE TERMINAL CLICK EVENT RECOGNITION METHOD AND APPARATUS

(71) Applicant: ADVANCED NEW TECHNOLOGIES CO., LTD., Grand Cayman (KY)

(72) Inventor: Sen Yu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/882,685

(22) Filed: May 25, 2020

(65) Prior Publication Data

US 2020/0285382 A1     Sep. 10, 2020

Related U.S. Application Data

(63) Continuation of application No. PCT/CN2018/123026, filed on Dec. 24, 2018.

(30) Foreign Application Priority Data

Jan. 2, 2018     (CN) .......................... 2018 1 0001504

(51) Int. Cl.
*G06F 3/0488* (2013.01)
*G06F 9/54* (2006.01)
*G06F 3/0485* (2013.01)

(52) U.S. Cl.
CPC ........ *G06F 3/04883* (2013.01); *G06F 3/0485* (2013.01); *G06F 9/542* (2013.01)

(58) Field of Classification Search
CPC .... G06F 3/0488; G06F 16/95; G06F 3/04883; G06F 9/542; G06F 3/0485
See application file for complete search history.

(56) References Cited

U.S. PATENT DOCUMENTS

| 7,487,461 B2 | 2/2009 | Zhai et al. |
| 8,224,392 B2 | 7/2012 | Kim et al. |

(Continued)

FOREIGN PATENT DOCUMENTS

| CN | 103365588 A | 10/2013 |
| CN | 103488303 A | 1/2014 |

(Continued)

OTHER PUBLICATIONS

PCT International Search Report and the Written Opinion dated Mar. 26, 2019, issued in related International Application No. PCT/CN2018/123026, with English translation (17 pages).

(Continued)

*Primary Examiner* — Nicholas Ulrich

(57) ABSTRACT

A mobile terminal tap event recognition method and apparatus are disclosed. The method includes: recording a plurality of touch events detected by a touch screen of a mobile terminal by recording an event type and a timestamp of each touch event; forming one or more completed groups of touch events based on the even types and the timestamps of the plurality of touch events; determining, in response to a tap event and according to the plurality of touch events, whether the tap event takes place in a page scrolling process; and cancelling, in response to a determination that the tap event takes place in the page scrolling process, the tap event.

17 Claims, 3 Drawing Sheets

(56) References Cited

U.S. PATENT DOCUMENTS

| | | | |
|---|---|---|---|
| 8,390,577 B2 | 3/2013 | Lemort et al. | |
| 8,451,236 B2 | 5/2013 | Duarte et al. | |
| 8,743,068 B2 | 6/2014 | Ludwig | |
| 9,104,308 B2 | 8/2015 | Au et al. | |
| 9,189,500 B2 | 11/2015 | Stallings et al. | |
| 9,395,905 B2 | 7/2016 | Wherry | |
| 9,491,279 B2 | 11/2016 | Park et al. | |
| 9,772,762 B2 | 9/2017 | Kim et al. | |
| 9,989,994 B2 | 6/2018 | Jeon et al. | |
| 2009/0006543 A1 | 1/2009 | Smit | |
| 2014/0298251 A1* | 10/2014 | Ohtsuka | G06F 3/04883 715/784 |
| 2015/0120861 A1* | 4/2015 | Huang | G06F 16/957 709/213 |
| 2016/0179322 A1* | 6/2016 | Nagata | G06F 3/04883 715/784 |
| 2018/0024718 A1* | 1/2018 | Yang | G06F 3/0485 345/156 |
| 2018/0039393 A1* | 2/2018 | Williamson | G06F 3/0488 |
| 2018/0059928 A1 | 3/2018 | Westerman et al. | |
| 2019/0005923 A1 | 1/2019 | Kim et al. | |
| 2019/0191042 A1* | 6/2019 | Yamaguchi | G06F 3/04883 |
| 2019/0354257 A1* | 11/2019 | Yoshii | G06F 3/0488 |

FOREIGN PATENT DOCUMENTS

| | | |
|---|---|---|
| CN | 104111785 A | 10/2014 |
| CN | 105824606 A | 8/2016 |
| CN | 105892871 A | 8/2016 |
| CN | 105892894 A | 8/2016 |
| CN | 106095418 A | 11/2016 |
| CN | 106547454 A | 3/2017 |
| CN | 107203315 A | 9/2017 |
| CN | 108388393 A | 8/2018 |
| WO | 2012/087939 A1 | 6/2012 |
| WO | 2014/142503 A1 | 9/2014 |

OTHER PUBLICATIONS

Search Report dated Dec. 30, 2019, issued in related Taiwanese Application No. 107143206 (1 page).
First Search dated Jan. 15, 2020, issued in related Chinese Application No. 201810001504.3 (1 page).
First Office Action dated Jan. 22, 2020, issued in related Chinese Application No. 201810001504.3, with English machine translation (16 pages).
Second Office Action dated Mar. 30, 2020, issued in related Chinese Application No. 201810001504.3, with English machine translation (17 pages).
Supplementary Search dated Apr. 22, 2020, issued in related Chinese Application No. 201810001504.3 (1 page).
Third Office Action dated May 6, 2020, issued in related Chinese Application No. 201810001504.3, with English machine translation (13 pages).
Supplementary Search for Chinese Application No. 201810001504.3 dated Jul. 14, 2020.

* cited by examiner

MOBILE TERMINAL CLICK EVENT RECOGNITION METHOD AND APPARATUS

CROSS-REFERENCE TO RELATED APPLICATIONS

This application is a continuation application of International Patent Application No. PCT/CN2018/123026, filed on Dec. 24, 2018, which is based on and claims priority of the Chinese Patent Application No. 201810001504.3, filed on Jan. 2, 2018. The above-referenced applications are incorporated herein by reference in their entirety.

TECHNICAL FIELD

This specification relates to the field of terminal technologies, and in particular, to a mobile terminal tap event recognition method and apparatus.

BACKGROUND

With the rapid development of Internet technologies, a browser control may be configured in application (APP) software of a terminal device to implement functions such as web page browsing. In a process of using a browser control to browse a web page, how to effectively and accurately recognize a tap event plays a vital role in browsing experience of a user.

SUMMARY

In view of the above, this specification provides a mobile terminal tap event recognition method and apparatus.

In particular, a first aspect of this specification is directed to a mobile terminal tap event recognition method. The method may include: recording a touch event detected by a touch screen of a mobile terminal, which may be performed by: modifying, in response to the touch event being a touch event of a specified category, an event name of the touch event, and recording a modified event name of the touch event and a timestamp corresponding to the touch event; and recording, in response to the touch event not being the touch event of the specified category, the event name of the touch event and the timestamp corresponding to the touch event. The method may further include determining, in response to a triggering of a tap event and according to the recorded touch event, whether the triggering of the tap event takes place in a page scrolling process; and cancelling the tap event in response to a determination that the triggering of the tap event takes place in the page scrolling process.

A second aspect of this this specification is directed to a mobile terminal tap event recognition apparatus, comprising a processor and a non-transitory computer-readable memory coupled to the processor and configured with instructions executable by the processor to: record a touch event detected by a touch screen of a mobile terminal by modifying, in response to the touch event being a touch event of a specified category, an event name of the touch event, and recording a modified event name of the touch event and a timestamp corresponding to the touch event; and recording, in response to the touch event not being a touch event of the specified category, the event name of the touch event and a timestamp corresponding to the touch event; determine, in response to a triggering of a tap event and according to the recorded touch event, whether the triggering of the tap event takes place in a page scrolling process; and cancel the tap event in response to a determination that the triggering of the tap event takes place in the page scrolling process.

A third aspect of this specification is directed to a non-transitory computer-readable storage medium having instructions stored thereon executable by a processor to cause the processor to perform any one of the foregoing mobile terminal tap event recognition methods.

Additionally, this specification further provides a mobile terminal tap event recognition method, applicable to a mobile terminal. The method may include recording, by the mobile terminal, a plurality of touch events detected by a touch screen of the mobile terminal by recording an event type and a timestamp of each touch event in the plurality of touch events; forming, based on the event types and the timestamps of the plurality of touch events, one or more completed groups of touch events, wherein each of the one or more completed groups of touch events includes a complete sequence of touch events starting with a touch event having the event type of a starting type, and ending with a touch event having the event type of an ending type; determining, in response to a tap event and according to the plurality of touch events, whether the tap event takes place in a page scrolling process, wherein the tap event is determined to take place in the page scrolling process if a last completed group of touch events before the tap event includes a touch event having the event type of a scroll type; and cancelling, in response to a determination that the tap event takes place in the page scrolling process, the tap event.

This specification further provides a mobile terminal tap event recognition apparatus. The apparatus may include a processor and a non-transitory computer-readable memory coupled to the processor and configured with instructions executable by the processor to: record a plurality of touch events detected by a touch screen of a mobile terminal by recording an event type and a timestamp of each touch event in the plurality of touch events; form, based on the event types and the timestamps of the plurality of touch events, one or more completed groups of touch events, wherein each of the one or more completed groups of touch events includes a complete sequence of touch events starting with a touch event having the event type of a starting type, and ending with a touch event having the event type of an ending type; determine, in response to a tap event and according to the plurality of touch events, whether the tap event takes place in a page scrolling process, wherein the tap event is determined to take place in the page scrolling process if a last completed group of touch events before the tap event includes a touch event having the event type of a scroll type; and cancel, in response to a determination that the tap event takes place in the page scrolling process, the tap event.

This specification further provides a non-transitory computer-readable storage medium. The storage medium may have instructions stored thereon executable by a processor to cause the processor to perform operations any one of the foregoing mobile terminal tap event recognition methods.

According to the foregoing description of this specification, when a tap event is triggered, it may be determined, according to the recorded touch event, whether the triggering of the tap event takes place in the page scrolling process, and the tap event may be cancelled if the triggering of the tap event is determined to take place is in the page scrolling process. Thus, misjudgement of an operation intention of a user is prevented and accuracy of tap event recognition is improved.

DETAIL DESCRIPTION OF THE EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. Implementations described in the following exemplary embodiments are not all implementations of this specification. On the contrary, the implementations described herein are merely examples of the apparatus and method that are described in claims in detail and that are consistent with some aspects of this specification.

The terms used in this specification are merely for the purpose of describing specific embodiments, and are not intended to limit this specification. The terms "a", "said" and "the" of singular forms used in this specification and the appended claims are also intended to include plural forms, unless otherwise specified in the context clearly. It should also be understood that, the term "and/or" used herein indicates and includes any or all possible combinations of one or more associated listed items.

It should be understood that although the terms such as first, second, and third may be used herein to describe various information, such information should not be limited to these terms. These terms are merely used for distinguishing information of the same type from each other. For example, within the scope of this specification, first information may also be referred to as second information, and similarly, second information may also be referred to as first information. Depending on the context, the term "if" as used herein may be interpreted as "when . . . " or "upon . . . " or "in response to determining."

Figure 1:
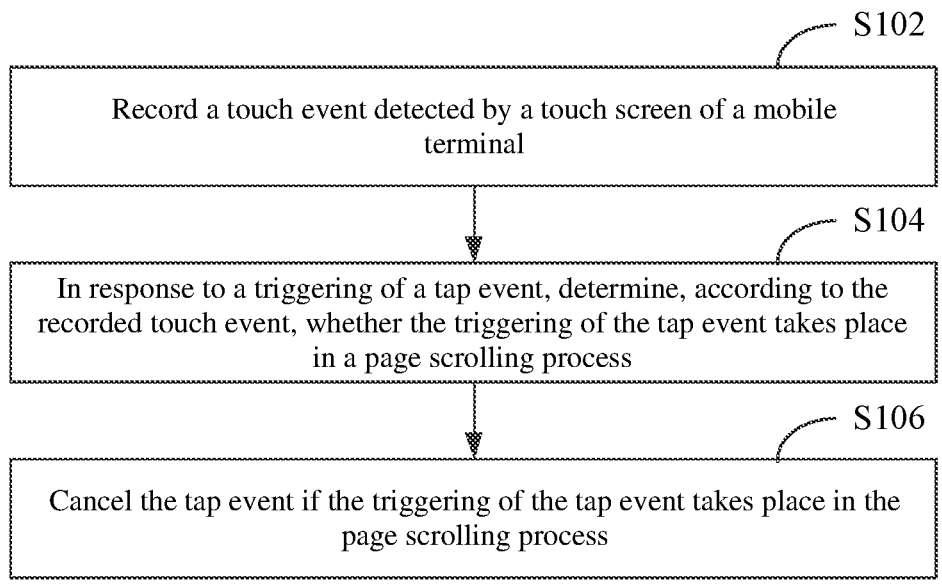
FIG. 1 is a schematic flowchart of a mobile terminal tap event recognition method according to an exemplary embodiment of this specification.

FIG. 1 is a schematic flowchart of a mobile terminal tap event recognition method according to an exemplary embodiment of this specification.

The mobile terminal tap event recognition method can be applied to a mobile terminal, for example, a tablet computer, a mobile phone, or a personal digital assistant (PDA), and this is not specifically limited in this specification.

Referring to FIG. 1, the mobile terminal tap event recognition method may include the following steps.

In step 102, a touch event detected by a touch screen of the mobile terminal may be recorded.

In some embodiments, the touch event may be an event that a touching object (e.g., a finger) interacting with the touch screen of the mobile terminal. The touch event may be a "touch start" event, a "touch move" event, a "touch end" event, a "touch cancel" event, a scroll event, and the like. The "touch start" event may be an event that the touch screen is first touched by the touching object (e.g., a finger). That is, the "touch start" event may record a beginning of a touch on the touch screen (i.e., a touch event of a starting type). The "touch move" event may be an event that the touching object is moving on the touch screen while remaining in contact with the touch screen. The "touch end" event may be an event that the touching object departs from the touch screen. That is, the "touch end" event may record an end of the touch on the touch screen (i.e., a touch event of an ending type). The "touch cancel" event may be an event that a cancel command is received while the touching object is in contact with the touch screen. That is, the "touch cancel" event may record a cancellation of the touch on the touch screen (i.e., a touch event of a cancellation type). The scroll event (i.e., a touch event of scroll type) may be an event of scrolling display content of the mobile terminal, which may be further divided into an event of scrolling global display content (i.e., a touch event of a global scroll type) and an event of scrolling regional display content (i.e., a touch event of a regional scroll type).

Each touch event may have an event name (event type) and a timestamp associated with it. The event name (event type) may represent the characteristic of the touch event, and the timestamp may be a time point at which the corresponding touch event occurs.

In this specification, the term "event name" and "event type" are interchangeably used. An event name indicates an event type. To facilitate the understanding of this specification, descriptive terms, such as "touch start," "touch move," "touch cancel," "touch end," as described above, as well as "scroll:window" and "scroll:target," which will be introduced later, may be used as event names (event types) of various touch events. Obviously, the foregoing terms are just some exemplary event names (event types) that may be used and are not intended to be limiting. In actual applications, other event names (event types) may be used without departing from the protection scope of this specification.

In some embodiments, the event name of the touch event and the timestamp of the touch event may be recorded according to a related rule.

In some embodiment, the mobile terminal may repeatedly detect and record touch events. That is, a plurality of touch events may be detected by the touch screen of the mobile terminal and may be recorded.

In step 104, in response to a triggering of a tap event, whether the triggering of the tap event takes place in a page scrolling process may be determined according to the recorded touch event.

In some embodiments, the tap event may be independently detected by a third-party control. Related technical literatures may be referred to for a detection manner of the tap event, which is not specifically limited in this specification.

When it is detected that the tap event has been triggered, it may be determined, according to the recorded touch event, whether the triggering of the tap event takes place in the page scrolling process. That is, it may be determined that whether a user triggers the tap event in the page scrolling process.

In step 106: the tap event may be cancelled if the triggering of the tap event takes place in the page scrolling process.

Based on the determination result of step 104, if the triggering of the tap event takes place in the page scrolling process, it may indicate that the tap event is used to stop page scrolling, instead of as a browsing instruction entered for specified content on a page. Therefore, the tap event may be cancelled to prevent page switching.

According to the foregoing description of this specification, when a tap event is triggered, it may be determined, according to the recorded touch event, whether the triggering of the tap event takes place in the page scrolling process, and the tap event may be cancelled if the triggering of the tap event is determined to take place in the page scrolling process. Thus, misjudgement of an operation intention of a user is prevented and accuracy of tap event recognition is improved.

Figure 2:
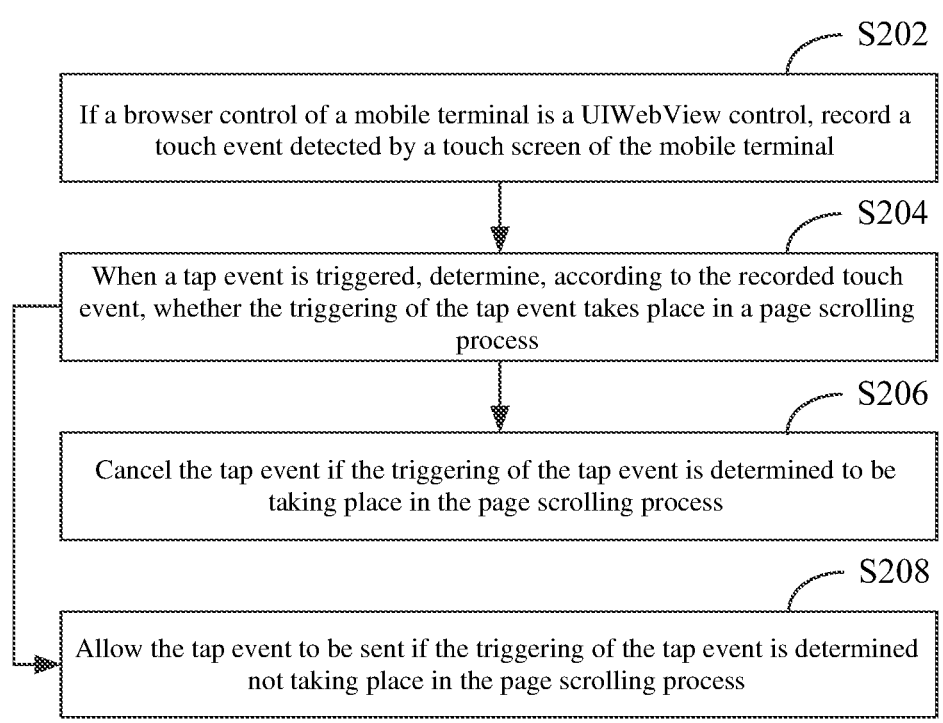
FIG. 2 is a schematic flowchart of another mobile terminal tap event recognition method according to an exemplary embodiment of this specification.

FIG. 2 is a schematic flowchart of another mobile terminal tap event recognition method according to an exemplary embodiment of this specification.

Referring to FIG. 2, the mobile terminal tap event recognition method may include the following steps.

In step 202, if a browser control of a mobile terminal is a UIWebView control, a touch event detected by a touch screen of the mobile terminal may be recorded.

In some embodiments, the browser control may include a plurality of categories, for example, a UIWebView control of the iOS system, a WKWebView control of the iOS system, a UC3 kernel of the Android system, and a UC4 kernel of the Android system.

In the foregoing browser controls, the WKWebView control, the UC3 kernel, and the UC4 kernel can usually recognize a tap event accurately. Therefore, in some embodiments, a category of the browser control of the mobile terminal may be determined first. If the category of the browser control is a UIWebView control, a subsequent step may be performed to record the touch event detected by the touch screen of the mobile terminal. If the category of the browser control is not a UIWebView control, the subsequent steps may not need to be performed.

Figure 3:
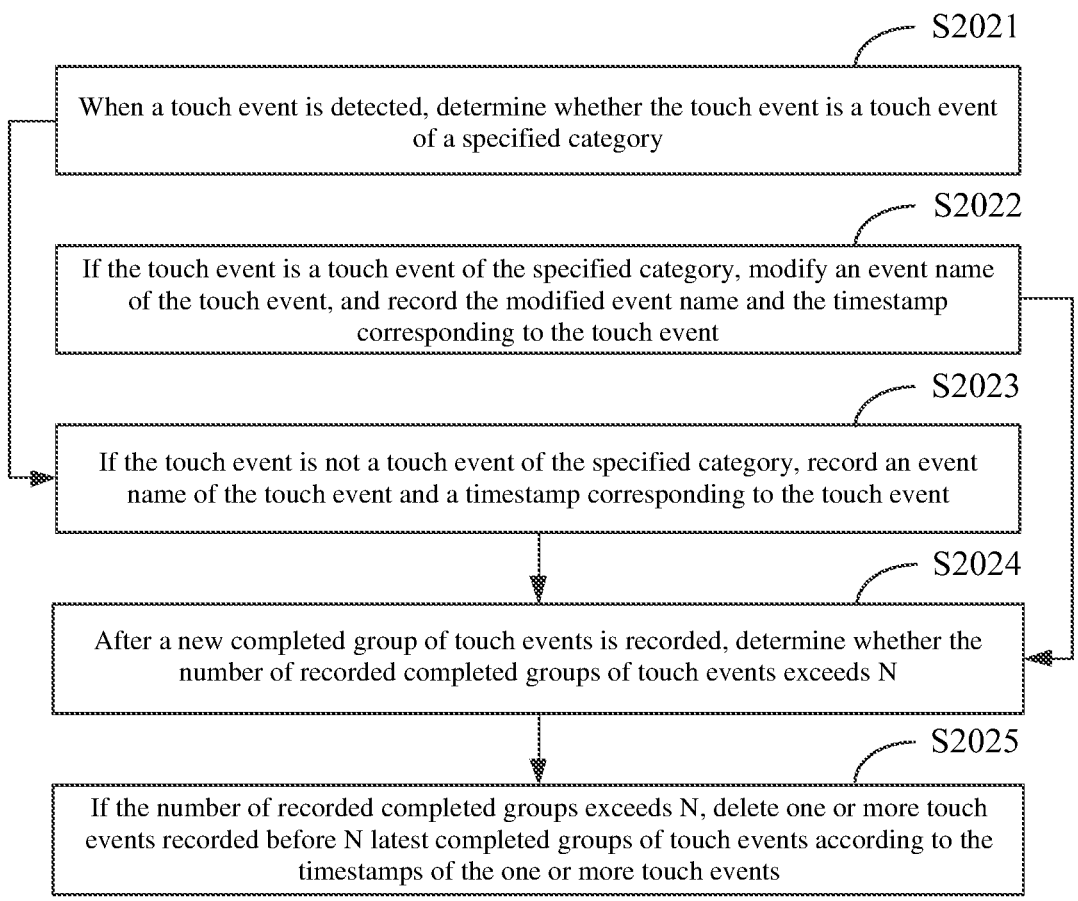
FIG. 3 is a schematic flowchart of a touch event recording method according to an exemplary embodiment of this specification.

In some embodiments, referring to FIG. 3, a process of recording the touch event may include the following steps.

In step 2021, when the touch event is detected, whether the touch event is a touch event of a specified category may be determined.

In some embodiments, the touch event may include the "touch start" event, the "touch move" event, the "touch end" event, the "touch cancel" event, the scroll event, and the like. Relevant technical literatures may be referred to for a trigger opportunity of each touch event, details of which are not described in this specification for the sake of conciseness.

The touch event of the specified category may be set in advance. For example, the touch event of the specified category may be set as the "touch cancel" event or the scroll event.

In some embodiments, if the detected touch event is a "touch cancel" event or a scroll event, step 2022 may be performed. If the detected touch event is a "touch start" event, a "touch move" event, or a "touch end" event, step 2023 may be performed.

In step 2022, if the touch event is a touch event of the specified category, the event name of the touch event may be modified, and the modified event name and the timestamp corresponding to the touch event may be recorded.

In some embodiments, recording a touch event generally include recording the event name of the touch event and the timestamp corresponding to the touch event, and the timestamp may usually be a time point at which the touch event is triggered. Certainly, other information of the touch event, such as attribute information of the touch event, may be recorded. This is not specifically limited in this specification.

Based on the determination result of step 2021, if the detected touch event is the touch event of the specified category, the event name of the touch event may be modified, and the modified event name and the timestamp corresponding to the touch event may be recorded.

For example, if the detected touch event is a "touch cancel" event, the event name of the "touch cancel" event may be modified to "touch end", and then a correspondence between the modified event name (i.e., "touch end") and the timestamp of the "touch cancel" event may be recorded.

For another example, if the detected touch event is a scroll event, whether the scroll event is global page scrolling (i.e., global scroll type) or regional page scrolling (i.e., regional scroll type) may be determined according to attribute information of the scroll event. In particular, a return value of a currently acting node "event.target" may be acquired first. The return value may be acquired through appropriate user interface or computer instructions on the mobile terminal. If the return value is a document, it may be determined that the scroll event is global page scrolling. If the return value is not a document, it may be determined that the scroll event is regional page scrolling (i.e., a region in a page, rather than the entire page, is scrolling).

If the scroll event is global page scrolling, the event name of the scroll event may be modified to "scroll:window". If the scroll event is regional page scrolling, the event name of the scroll event may be modified to "scroll:target".

Certainly, according to different circumstances of the scroll event, the event name may also be modified to other event names, as long as global page scrolling can be can distinguished from regional page scrolling. This is not specifically limited in this specification.

The naming for various touch events in this specification, including "scroll:window" and "scroll:target" specified above, follows common naming rules and conventions in this field. Obviously, other naming schemes may be used for the touch events, and this specification is not limited in this regard.

In step 2023, if the touch event is not a touch event of the specified category, the event name of the touch event and the timestamp corresponding to the touch event may be recorded.

Based on the determination result of step 2021, if the detected touch event is not the touch event of the specified category, the event name of the touch event and the timestamp corresponding to the touch event may be directly recorded.

For example, if the detected touch event is a "touch start" event, a correspondence between the "touch start" event and the timestamp of the "touch start" event may be recorded.

For another example, if the detected touch event is a "touch move" event, a correspondence between the "touch move" event and the timestamp of the "touch move" event may be recorded.

For another example, if the detected touch event is a "touch end" event, a correspondence between the "touch end" event and the timestamp of the "touch end" event may be recorded.

In step 2024, after a new completed group of touch events is recorded, whether the number of recorded completed groups of touch events exceeds N may be determined.

In some embodiments, after a new touch event is recorded, it may be determined whether a completed group of touch events has been recorded. A completed group of touch events may include a "touch start" event, an intermediate event, and a "touch end" event. The intermediate event may include zero, one or many "touch move" events, "scroll:window" events, or "scroll:target" events. That is, a completed group of touch events may be a group of touch events beginning with a "touch start" event and ending with a "touch end" event. In particular, determining whether a new completed group of touch events has been recorded may be performed after a "touch end" event has been recorded.

Table 1 and Table 2 show two different completed groups of touch events. Certainly, Table 1 and Table 2 are merely exemplary descriptions. In actual application, a completed group of touch events may be represented in various other forms. Details are not described in this specification for the sake of conciseness.

In some embodiments, after a new completed group of touch events is recorded, it may be determined whether the number of recorded completed groups of touch events exceeds N. N is a natural number greater than or equal to 1, and a specific value of N may be set according to specific requirements. For example, N may equal to 2.

TABLE 1

| Number | Event name | Timestamp |
|--------|------------|-----------|
| 1 | touch start | T1 |
| 2 | touch move | T2 |
| 3 | touch end | T3 |

TABLE 2

| Number | Event name | Timestamp |
|--------|------------|-----------|
| 1 | touch start | T11 |
| 2 | touch move | T12 |
| 3 | scroll:target | T13 |
| 4 | touch end | T14 |

It should be noted that other touch events, such as a "scroll:target" event and a "scroll:window" event, may be further recorded between two completed groups of touch events that are adjacent in terms of time. This is not specifically limited in this specification.

In step 2025, if the number of recorded completed groups exceeds N, one or more touch events recorded before N latest recorded completed groups of touch events may be deleted according to the timestamps of the one or more touch events. N is a natural number greater than or equals to 1.

Based on the determination result of step 2024, if it is determined that the number of recorded completed groups exceeds N, one or more touch events recorded before the N latest recorded completed groups of touch events may be deleted according to the timestamps of the one or more touch events. That is, only the N latest recorded completed groups of touch events will be retained.

Taking N being 2 as an example, only latest two completed groups of touch events may be retained. Assuming the latest two completed groups of touch events are those shown in Table 1 and Table 2, namely, a first completed group of touch events and a second completed group of touch event, respectively. If the timestamp T1 is earlier than the timestamp T11, all recorded touch events whose timestamps are earlier than T1 may be deleted.

Certainly, in actual applications, some touch events may be recorded at time between T3 and T11. Timestamps of these touch events are later than T1, and therefore these touch events may be retained.

In step 204, if a tap event is triggered, whether the triggering of the tap event takes place in a page scrolling process may be determined according to the recorded touch event.

In some embodiments, if a tap event (e.g., a click event) is triggered, it may be determined whether the tap event is triggered in the page scrolling process according to the currently recorded touch event. Because page scrolling may be respectively global page scrolling or regional page scrolling, the determination may be separately performed for global page scrolling and regional page scrolling. In this specification, global page scrolling may mean content on the entire display region of the mobile terminal is scrolling, and regional page scrolling may mean only content on a portion of the display region of the mobile terminal is scrolling.

Still taking N being 2 as an example, as explained above, there are two recorded completed groups of touch events (i.e., the first completed group of touch event and the second completed group of touch events) in this case. When the recorded touch event is global page scrolling (i.e., when the recorded touch event is a "scroll:window" event), it may be determined whether there is a "scroll:window" event between the first completed group of touch events and the second completed group of touch events, and whether there is a "scroll:window" event in the second completed group of touch events.

If there is no "scroll:window" event between the first completed group of touch events and the second completed group of touch events, and there is a "scroll:window" event in the second completed group of touch events, it may be determined that the triggering of the tap event takes place in the page scrolling process. Otherwise, it may be determined that the triggering of the tap event does not take place in the page scrolling process.

The first completed group of touch events may refer to the completed group with earlier timestamps, and correspondingly, the second completed group of touch events may refer to the completed group with later timestamps.

Referring to the records shown in Table 3, the first completed group of touch events may include touch events of numbers 1 to 3, and the second completed group of touch events may include touch events of numbers 4 to 7. In the records shown in Table 3, there is no "scroll:window" event between the first completed group of touch events and the second completed group of touch events, and there is a "scroll:window" event (i.e., entry #6 shown in Table 3) in the second completed group of touch events, it may be determined that the triggering of the tap event takes place in the page scrolling process.

TABLE 3

| Number | Event name | Timestamp |
|--------|------------|-----------|
| 1 | touch start | T21 |
| 2 | touch move | T22 |
| 3 | touch end | T23 |
| 4 | touch start | T24 |
| 5 | touch move | T25 |
| 6 | scroll:window | T26 |
| 7 | touch end | T27 |

TABLE 4

| Number | Event name | Timestamp |
|--------|------------|-----------|
| 1 | touch start | T31 |
| 2 | touch move | T32 |
| 3 | touch end | T33 |
| 4 | scroll:window | T34 |
| 5 | touch start | T35 |
| 6 | touch move | T36 |

TABLE 4-continued

| Number | Event name | Timestamp |
|---|---|---|
| 7 | scroll:window | T37 |
| 8 | touch end | T38 |

Referring to the records shown in Table 4, the first completed group of touch events may include touch events of numbers 1 to 3, and the second completed group of touch events may include events of numbers 5 to 8. In the records shown in Table 4, there is a "scroll:window" event (i.e., entry #4 shown in Table 4) between the first completed group of touch events and the second completed group of touch events, hence it may be determined that the triggering of the tap event does not take place in the page scrolling process.

Still taking N being 2 as an example, if the recorded touch event is regional page scrolling (i.e., a "scroll:target" event), it may be determined whether there is a "scroll:target" event in the first completed group of touch events, and whether there is a "scroll:target" event in the second completed group of touch events.

If there is no "scroll:target" event in the first completed group of touch events, and there is a "scroll:target" event in the second completed group of touch events, it may be determined that the triggering of the tap event takes place in the page scrolling process. Alternatively, if there is no "scroll:target" event in the first completed group of touch events, and there is a "scroll:target" event after the second completed group of touch events, it may be determined that the triggering of the tap event takes place in the page scrolling process. Otherwise, it may be determined that the triggering of the tap event does not take place in the page scrolling process.

TABLE 5

| Number | Event name | Timestamp |
|---|---|---|
| 1 | touch start | T41 |
| 2 | touch move | T42 |
| 3 | touch end | T43 |
| 4 | touch start | T44 |
| 5 | touch move | T45 |
| 6 | scroll:target | T46 |
| 7 | touch end | T47 |

TABLE 6

| Number | Event name | Timestamp |
|---|---|---|
| 1 | touch start | T51 |
| 2 | touch move | T52 |
| 3 | scroll:target | T53 |
| 4 | touch end | T54 |
| 5 | touch start | T55 |
| 6 | scroll:target | T56 |
| 7 | touch end | T57 |

Referring to the records shown in Table 5, the first completed group of touch events may include events of numbers 1 to 3, and the second completed group of touch events may include events of numbers 4 to 7. In the records shown in Table 5, there is no "scroll:target" event in the first completed group of touch events, and there is a "scroll:target" event (entry #6 shown in Table 5) in the second completed group of touch events, hence it may be determined that the triggering of the tap event takes place in the page scrolling process.

Referring to the records shown in Table 6, the first completed group of touch events may include events of numbers 1 to 4, and the second completed group of touch events may include events of numbers 5 to 7. In the records shown in Table 6, there is a "scroll:target" event (entry #3 shown in Table 6) in the first completed group of touch events, hence it may be determined that the triggering of the tap event does not take place in the page scrolling process.

Certainly, in actual application, the foregoing rule may apply to touch events recorded in other forms, and details of which are not described in this specification for the sake of conciseness.

In addition, if the value of N is other value, a corresponding determination rule may be set according to the specific value of N. This is not specifically limited in this specification.

In step 206, the tap event may be cancelled if the triggering of the tap event is determined to take place in the page scrolling process.

Based on the determination result of step 204, if the triggering of the tap event is determined to take place in the page scrolling process, indicating that the tap event is used to stop page scrolling, instead of as a browsing instruction entered for specified content on a page, the tap event may be cancelled to prevent page switching.

In step 208, the tap event may be allowed to be sent if the triggering of the tap event is determined not taking place in the page scrolling process. That is, the tap event may be processed by the mobile terminal.

Based on the determination result of step 204, if the triggering of the tap event is determined not taking place in the page scrolling process, indicating that the tap event is used to browse a designated link, the tap event may be allowed to be sent.

According to the foregoing description of this specification, when a tap event is triggered, it may be determined, according to the recorded touch event, whether the triggering of the tap event takes place in a page scrolling process. The tap event may be cancelled if the triggering of the tap event is determined to take place in a page scrolling process. Thus, misjudgement of an operation intention of a user is prevented and accuracy of tap event recognition is improved.

It should be noted that, in actual application, touch event rules for touch events that are not in the page scrolling process may also be adopted. This is not specifically limited in this specification.

Corresponding to the foregoing embodiment of the mobile terminal tap event recognition method, this specification further provides a mobile terminal tap event recognition apparatus.

Figure 4:
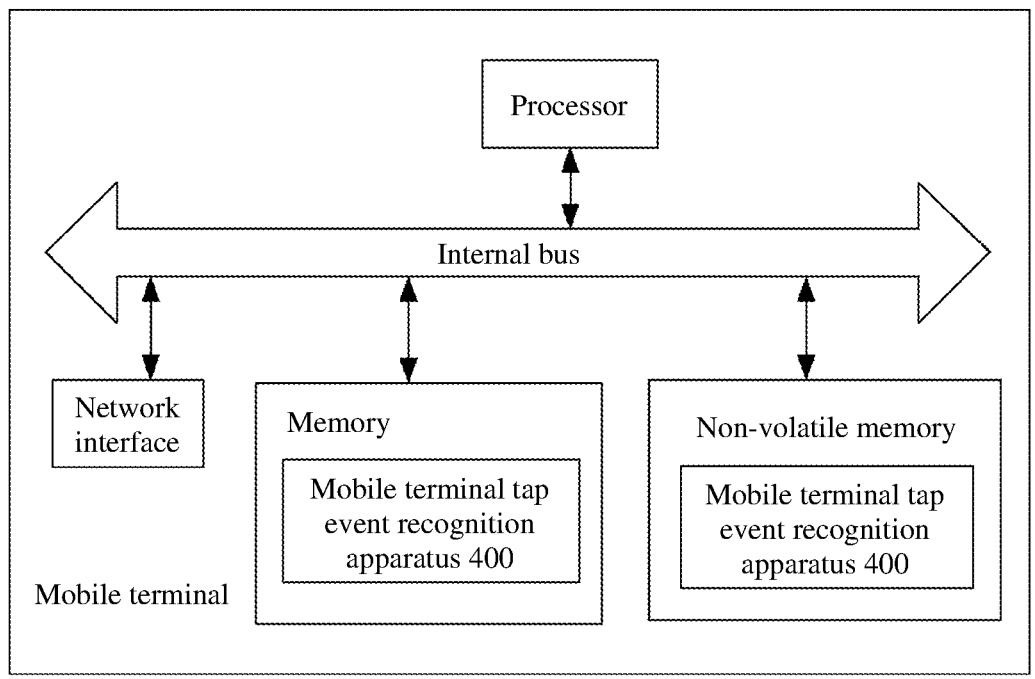
FIG. 4 is a schematic structural diagram of a mobile terminal tap event recognition apparatus according to an exemplary embodiment of this specification.

The embodiments of the mobile terminal tap event recognition apparatus in this specification may be applicable to a mobile terminal. The apparatus embodiment may be implemented by software, or by hardware or a combination of software and hardware. Taking software implementation as an example, as an apparatus in a logical sense, the apparatus may be formed by reading a corresponding computer program instruction in a non-volatile memory into a memory through a processor of a mobile terminal in which the apparatus is located. In terms of hardware, FIG. 4 is a hardware structure diagram of a mobile terminal in which a mobile terminal tap event recognition apparatus of this specification may be located. In some embodiments, in addition to a processor, a memory, a network interface, and a non-volatile memory shown in FIG. 4, the mobile terminal in which the apparatus is located may include other hardware. Details are not described herein for the sake of conciseness.

Figure 5:
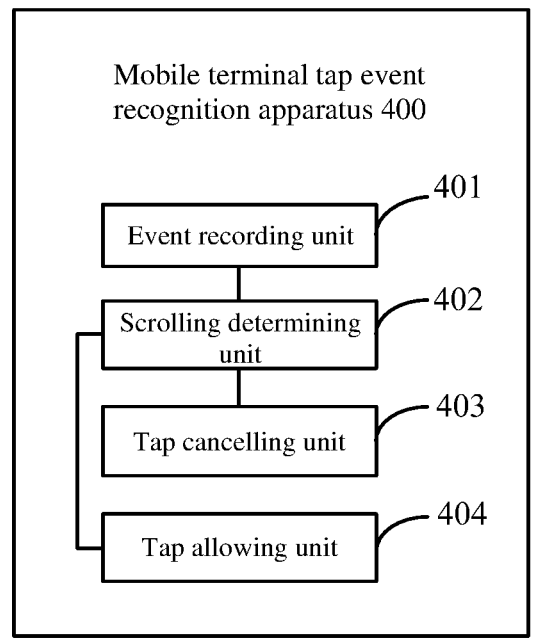
FIG. 5 is a block diagram of a mobile terminal tap event recognition apparatus according to an exemplary embodiment of this specification.

FIG. 5 is a block diagram of a mobile terminal tap event recognition apparatus, according to an exemplary embodiment of this specification.

Referring to FIG. 5, the mobile terminal tap event recognition apparatus 400 may be applicable to the mobile terminal shown in FIG. 4 and may include an event recording unit 401, a scrolling determining unit 402, a tap cancelling unit 403, and a tap allowing unit 404.

The event recording unit 401 may be configured to record a touch event detected by a touch screen of a mobile terminal.

The scrolling determining unit 402 may be configured to: determine, in response to a triggering of a tap event and according to the recorded touch event, whether the triggering of the tap event takes place in a page scrolling process.

The tap cancelling unit 403 may be configured to cancel the tap event if the triggering of the tap event is determined to take place in the page scrolling process.

The tap allowing unit 404 may be configured to allow the tap event to be sent if the triggering of the tap event is determined not taking place in the page scrolling process.

In some embodiments, the event recording unit 401 may be configured to: record, if a browser control of the mobile terminal is a UIWebView control, the touch event detected by the touch screen of the mobile terminal.

In some embodiments, the event recording unit 401 may be configured to: modify, if the detected touch event is a touch event of a specified category, the event name of the touch event, and record the modified event name and the timestamp corresponding to the touch event; and record, if the detected touch event is not a touch event of the specified category, the event name of the touch event and the timestamp corresponding to the touch event.

The event recording unit 401 may be further configured to: after a completed group of touch events beginning with a "touch start" even and ending with a "touch end" event is recorded, determine whether a number of recorded completed groups of touch events exceeds N; and if the number of recorded completed groups exceeds N, delete one or more touch events recorded before N latest recorded completed groups of touch events according to the timestamps of the one or more touch events. N is a natural number greater than or equal to 1.

In some embodiments, the event recording unit 401 may be configured to, if the touch event is a "touch cancel" event, modify the event name of the touch event to "touch end". The event recording unit 401 may be configured to determine, if the touch event is a scroll event, whether the touch event is global page scrolling or regional page scrolling according to attribute information of the touch event. The event recording unit 410 may modify the event name of the scroll event to "scroll:window" if the scroll event is determined to be global page scrolling, and modify the event name of the scroll event to "scroll:target" if the scroll event is determined to be regional page scrolling.

In some embodiments, N may equal to 2, the scrolling determining unit 402 may be configured to determine that the triggering of the tap event takes place in the page scrolling process if the recorded touch event is global page scrolling, there is no "scroll:window" event between a first completed group of touch events and a second completed group of touch events, and there is a "scroll:window" event in the second completed group of touch events.

The scrolling determining unit 402 may be configured to determine that the triggering of the tap event takes place in the page scrolling process when the recorded touch event is regional page scrolling, there is no "scroll:target" event in the first completed group of touch events, and there is a "scroll:target" event in or after the second completed group of touch events.

The implementation processes of the corresponding steps in the foregoing method embodiments may be referred to for details about the implementation processes of the functions and effects of the units in the foregoing apparatus, details of which are not described herein again for the sake of conciseness.

The apparatus embodiments may correspond to the method embodiments, and therefore for related parts, reference may be made to relevant descriptions in the method embodiments. The described apparatus embodiments are merely examples. The units described as separate parts may or may not be physically separated, and parts displayed as units may or may not be physical units, may be located in one position, or may be distributed on a plurality of network units. A part or all of the modules may be selected according to actual requirements to achieve the objectives of the solutions of this specification. A person of ordinary skill in the art may understand and implement the embodiments of the present application without creative efforts.

The system, apparatus, module, or unit described in the foregoing embodiment may be specifically implemented by a computer chip or entity, or a product with a specified function. A typical implementation device is a computer, and a specific form of the computer may be a personal computer, a laptop computer, a cellular phone, a camera phone, a smartphone, a personal digital assistant, a media player, a navigation device, an email device, a game console, a tablet computer, a wearable device, or a combination of any of these devices.

Corresponding to the foregoing embodiment of the mobile terminal tap event recognition method, this specification further provides a mobile terminal tap event recognition apparatus. The mobile terminal tap event recognition apparatus may include a processor and a non-transitory computer-readable memory coupled with the processor. The memory may be configured with instructions executable by the processor. The instructions may be machine-executable and may correspond to the foregoing mobile terminal tap event recognition method. The processor and the memory may usually be interconnected through an internal bus. In other possible implementations, the apparatus may further include an external interface for communication with other devices or components.

In some embodiments, by reading and executing the machine-executable instructions stored in the memory, the processor may be caused to record a touch event detected by a touch screen of a mobile terminal; determine, in response to a triggering of a tap event and according to the recorded touch event, whether the triggering of the tap event takes place in a page scrolling process; and cancel the tap event in response to a determination that the triggering of the tap event takes place in the page scrolling process.

In some embodiments, by reading and executing the machine-executable instruction stored in the memory, the processor may be further caused to allow the tap event to be sent in response to a determination that the triggering of the tap event does not take place in the page scrolling process.

In some embodiments, when recording the touch event detected by the touch screen of the mobile terminal, the processor may be caused to: record, if a browser control of the mobile terminal is a UIWebView control, the touch event detected by the touch screen of the mobile terminal.

In some embodiments, when recording the touch event detected by the touch screen of the mobile terminal, the processor may be caused to modify, in response to the detected touch event being a touch event of a specified category, the event name of the touch event, and record the modified event name and the timestamp corresponding to the touch event; record, in response to the detected touch event not being a touch event of the specified category, the event name of the touch event and the timestamp corresponding to the touch event; after a completed group of touch events beginning with a "touch start" event and ending with a "touch end" event is recorded, determine whether a number of recorded completed groups of touch events exceeds N; and if the number of recorded completed groups of touch events exceeds N, delete one or more touch events recorded before N latest completed groups of touch events according to the timestamps of the one or more touch events, where N is a natural number greater than or equal to 1.

In some embodiments, if the touch event is a "touch cancel" event, the modifying the event name of the touch event may include: modifying the event name of the touch event to "touch end". If the touch event is a scroll event, the modifying the event name of the touch event may include: determining whether the touch event is global page scrolling or regional page scrolling according to attribute information of the touch event; modifying the event name of the touch event to "scroll:window" if the touch event is determined to be global page scrolling; and modifying the event name of the touch event to "scroll:target" if the touch event is determined to be regional page scrolling.

In some embodiments, N may equal to 2, and when determining, according to the recorded touch event, whether the triggering of the tap event takes place in the page scrolling process, the processor may be further caused to determine that the triggering of the tap event takes place in the page scrolling process if the recorded touch event is global page scrolling, there is no "scroll:window" event between a first completed group of touch events and a second completed group of touch events, and there is a "scroll:window" event in the second completed group of touch events. The processor may be further caused to determine that the triggering of the tap event takes place in the page scrolling process if the recorded touch event is regional page scrolling, there is no "scroll:target" event in the first completed group of touch events, and there is a "scroll:target" event in or after the second completed group of touch events.

Corresponding to the foregoing embodiment of the mobile terminal tap event recognition method, this specification further provides a mobile terminal tap event recognition apparatus. The apparatus may include a processor and a non-transitory computer-readable memory coupled to the processor and configured with instructions executable by the processor to: record a plurality of touch events detected by a touch screen of a mobile terminal by recording an event type and a timestamp of each touch event in the plurality of touch events; form, based on the event types and the timestamps of the plurality of touch events, one or more completed groups of touch events, wherein each of the one or more completed groups of touch events includes a complete sequence of touch events starting with a touch event having the event type of a starting type, and ending with a touch event having the event type of an ending type; determine, in response to a tap event and according to the plurality of touch events, whether the tap event takes place in a page scrolling process, wherein the tap event is determined to take place in the page scrolling process if a last completed group of touch events before the tap event includes a touch event having the event type of a scroll type; and cancel, in response to a determination that the tap event takes place in the page scrolling process, the tap event.

In some embodiments, the non-transitory computer-readable memory may be further configured with instructions executable by the processor to allow, in response to a determination that the tap event does not take place in the page scrolling process, the tap event to be sent.

In some embodiments, to record a plurality of touch events detected by a touch screen of a mobile terminal, the non-transitory computer-readable memory may be further configured with instructions executable by the processor to: record, in response to a browser control of the mobile terminal being a UIWebView control, the plurality of touch events detected by the touch screen of the mobile terminal.

In some embodiments, to record an event type and a timestamp of each touch event in the plurality of touch events, the non-transitory computer-readable memory is further configured with instructions executable by the processor to: modify, for each touch event having specified event types in the plurality of touch events, the event type of the touch event, and record the modified event type. The non-transitory computer-readable memory may be further configured with instructions executable to: after forming one or more completed groups of touch events, determine whether a number of completed groups of touch events exceeds N; and delete, in response to the number of completed groups of touch events exceeding N, all touch events recorded before N latest completed groups of touch events according to the timestamps of the touch events, wherein N is a natural number greater than or equal to 1.

In some embodiments, to modify the event type of the touch event, the non-transitory computer-readable memory may be further configured with instructions executable by the processor to: modify, for a touch event having the event type of a cancellation type, the event type of the touch event to the ending type; and modify, for a touch event having the event type of a scroll type, the event type of the touch event. The modification of the event type of the touch event may be done by: determining whether the touch event is global page scrolling or regional page scrolling according to attribute information of the touch event; modifying, in response to the touch event being the global page scrolling, the event type of the touch event to the global scroll type; and modifying, in response to the touch event being regional page scrolling, the event type of the touch event to the regional scroll type.

In some embodiments, N may equal to 2. To determine whether the tap event takes place in a page scrolling process, the non-transitory computer-readable memory may be further configured with instructions executable by the processor to: determine, in response to a last recorded touch event being the global page scrolling, there being no touch event of the global scroll type between a first completed group of touch events and a second completed group of touch events, and there being a touch event of the global scroll type in the second completed group of touch events, that the tap event takes place in the page scrolling process; and determine, in response to the last recorded touch event being the regional page scrolling, there being no touch event of the regional scroll type in the first completed group of touch events, and there being a touch event of the regional scroll type in or after the second completed group of touch events, that the tap event takes place in the page scrolling process.

In some embodiments, touch events in the first completed group of touch events may have timestamps earlier than timestamps of touch events in the second completed group of touch events.

Corresponding to the foregoing embodiments of the mobile terminal tap event recognition method, this specification further provides a computer-readable storage medium. The computer-readable storage medium may store a computer program executable by a processor. Upon being executed by a processor, the computer program may cause the processor to perform operations. The operations may include: recording a touch event detected by a touch screen of a mobile terminal; determining, in response to a triggering of a tap event and according to the recorded touch event, whether the triggering of the tap event takes place in a page scrolling process; and cancelling the tap event if the triggering of the tap event is determined to take place in the page scrolling process.

In some embodiments, the operations may further include: allowing the tap event to be sent if the triggering of the tap event is determined not taking place in the page scrolling process.

In some embodiments, the recording a touch event detected by a touch screen of a mobile terminal may include: recording, in response to a browser control of the mobile terminal being a UIWebView control, the touch event detected by the touch screen of the mobile terminal.

In some embodiments, the recording a touch event detected by a touch screen of a mobile terminal may include: if the detected touch event is a touch event of a specified category, modifying the event name of the touch event, and recording the modified event name and the timestamp corresponding to the touch event; if the detected touch event is not a touch event of the specified category, recording the event name of the touch event and the timestamp corresponding to the touch event; after a completed group of touch events beginning with a "touch start" event and ending with a "touch end" event is recorded, determining whether a number of recorded completed groups of touch events exceeds N; and if the number of recorded completed groups of touch events exceeds N, deleting one or more touch events recorded before N latest recorded completed groups of touch events according to the timestamps of the one or more touch events, where N is a natural number greater than or equal to 1.

In some embodiments, if the touch event is a "touch cancel" event, the modifying the event name of the touch event may include: modifying the event name of the touch event to "touch end".

If the touch event is a scroll event, the modifying the event name of the touch event may include: determining whether the touch event is global page scrolling or regional page scrolling according to attribute information of the touch event; modifying the event name of the touch event to "scroll:window" if the touch event is determined to be global page scrolling; and modifying the event name of the touch event to "scroll:target" if the touch event is determined to be regional page scrolling.

In some embodiments, N may equal to 2, and the determining, according to the recorded touch event, whether the triggering of the tap event takes place in a page scrolling process may include: determining that the triggering of the tap event takes place in the page scrolling process if the recorded touch event is global page scrolling, there is no "scroll:window" event between a first completed group of touch events and a second completed group of touch events, and there is a "scroll:window" event in the second completed group of touch events; and determining that the triggering of the tap event takes place in the page scrolling process if the recorded touch event is regional page scrolling, there is no "scroll:target" event in the first completed group of touch events, and there is a "scroll:target" event in or after the second completed group of touch events.

The embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

The foregoing descriptions are merely exemplary embodiments of this specification, but are not intended to limit this specification. Any modification, equivalent replacement, or improvement made without departing from the spirit and principle of this specification should fall within the protection scope of this specification.

What is claimed is:

1. A mobile terminal tap event recognition method, applicable to a mobile terminal, comprising:
   recording, by the mobile terminal, a plurality of touch events detected by a touch screen of the mobile terminal by recording an event type and a timestamp of each touch event in the plurality of touch events,
   wherein the recording an event type and a timestamp of each touch event in the plurality of touch events comprises:
      modifying, for each touch event having a specified event type in the plurality of touch events, the event type of the touch event, and recording the modified event type;
   forming, based on the event types and the timestamps of the plurality of touch events, one or more completed groups of touch events, wherein each of the one or more completed groups of touch events includes a complete sequence of touch events starting with a touch event having the event type of a starting type, and ending with a touch event having the event type of an ending type;
   determining, in response to a tap event and according to the plurality of touch events, whether the tap event takes place in a page scrolling process, wherein the tap event is determined to take place in the page scrolling process if a last completed group of touch events before the tap event includes a touch event having the event type of a scroll type; and
   cancelling, in response to a determination that the tap event takes place in the page scrolling process, the tap event,
   wherein the method further comprises: after forming one or more completed groups of touch events,
      determining whether a number of completed groups of touch events exceeds N; and
      deleting, in response to the number of completed groups of touch events exceeding N, all touch events recorded before N latest completed groups of touch events according to the timestamps of the touch events, wherein N is a natural number greater than or equal to 1.

2. The method of claim 1, further comprising:
allowing, in response to a determination that the tap event does not take place in the page scrolling process, the tap event to be processed by the mobile terminal.

3. The method of claim 1, wherein the mobile terminal has a UIWebView browser control.

4. The method of claim 1, wherein the modifying the event type of the touch event comprises:
modifying, for a touch event having the event type of a cancellation type, the event type of the touch event to the ending type; and
modifying, for a touch event having the event type of the scroll type, the event type of the touch event by:
determining whether the touch event is global page scrolling or regional page scrolling according to attribute information of the touch event;
modifying, in response to the touch event being the global page scrolling, the event type of the touch event to a global scroll type; and
modifying, in response to the touch event being the regional page scrolling, the event type of the touch event to a regional scroll type.

5. The method of claim 4, wherein N equals to 2, and the determining whether the tap event takes place in a page scrolling process comprises:
determining, in response to a last recorded touch event being the global page scrolling, there being no touch event of the global scroll type between a second-to-last completed group of touch events and a last completed group of touch events, and there being a touch event of the global scroll type in the last completed group of touch events, that the tap event takes place in the page scrolling process; and
determining, in response to the last recorded touch event being the regional page scrolling, there being no touch event of the regional scroll type in the second-to-last completed group of touch events, and there being a touch event of the regional scroll type in or after the last completed group of touch events, that the tap event takes place in the page scrolling process.

6. The method of claim 5, wherein touch events in the second-to-last completed group of touch events have timestamps earlier than timestamps of touch events in the last completed group of touch events.

7. A mobile terminal tap event recognition apparatus, comprising a processor and a non-transitory computer-readable memory coupled to the processor and configured with instructions executable by the processor to:
record a plurality of touch events detected by a touch screen of a mobile terminal by:
recording an event type and a timestamp of each touch event in the plurality of touch events,
wherein to record an event type and a timestamp of each touch event in the plurality of touch events, the non-transitory computer-readable memory is further configured with instructions executable by the processor to:
modify, for each touch event having specified event types in the plurality of touch events, the event type of the touch event, and record the modified event type;
form, based on the event types and the timestamps of the plurality of touch events, one or more completed groups of touch events, wherein each of the one or more completed groups of touch events includes a complete sequence of touch events starting with a touch event having the event type of a starting type, and ending with a touch event having the event type of an ending type;
determine, in response to a tap event and according to the plurality of touch events, whether the tap event takes place in a page scrolling process, wherein the tap event is determined to take place in the page scrolling process if a last completed group of touch events before the tap event includes a touch event having the event type of a scroll type; and
cancel, in response to a determination that the tap event takes place in the page scrolling process, the tap event, wherein the non-transitory computer-readable memory is further configured with instructions executable to: after forming one or more completed groups of touch events, determine whether a number of completed groups of touch events exceeds N; and
delete, in response to the number of completed groups of touch events exceeding N, all touch events recorded before N latest completed groups of touch events according to the timestamps of the touch events, wherein N is a natural number greater than or equal to 1.

8. The apparatus of claim 7, wherein the non-transitory computer-readable memory is further configured with instructions executable by the processor to:
allow, in response to a determination that the tap event does not take place in the page scrolling process, the tap event to be processed by the mobile terminal.

9. The apparatus of claim 7, wherein the mobile terminal has a UIWebView browser control.

10. The apparatus of claim, 7 wherein to modify the event type of the touch event, the non-transitory computer-readable memory is further configured with instructions executable by the processor to:
modify, for a touch event having the event type of a cancellation type, the event type of the touch event to the ending type; and
modify, for a touch event having the event type of the scroll type, the event type of the touch event by:
determining whether the touch event is global page scrolling or regional page scrolling according to attribute information of the touch event;
modifying, in response to the touch event being the global page scrolling, the event type of the touch event to a global scroll type; and
modifying, in response to the touch event being regional page scrolling, the event type of the touch event to a regional scroll type.

11. The apparatus of claim 10, wherein N equals to 2, and wherein to determine whether the tap event takes place in a page scrolling process, the non-transitory computer-readable memory is further configured with instructions executable by the processor to:
determine, in response to a last recorded touch event being the global page scrolling, there being no touch event of the global scroll type between a second-to-last completed group of touch events and a last completed group of touch events, and there being a touch event of the global scroll type in the last completed group of touch events, that the tap event takes place in the page scrolling process; and
determine, in response to the last recorded touch event being the regional page scrolling, there being no touch event of the regional scroll type in the second-to-last completed group of touch events, and there being a touch event of the regional scroll type in or after the last completed group of touch events, that the tap event takes place in the page scrolling process.

12. The apparatus of claim 11, wherein touch events in the second-to-last completed group of touch events have timestamps earlier than timestamps of touch events in the last completed group of touch events.

13. A non-transitory computer-readable storage medium having instructions stored thereon executable by a processor to cause the processor to perform operations, comprising:
- recording a plurality of touch events detected by a touch screen of a mobile terminal by:
  - recording an event type and a timestamp of each touch event in the plurality of touch events,
  - wherein the recording an event type and a timestamp of each touch event in the plurality of touch events comprises:
    - modifying, for each touch event having specified event types in the plurality of touch events, the event type of the touch event, and recording the modified event type;
- forming, based on the event types and the timestamps of the plurality of touch events, one or more completed groups of touch events, wherein each of the one or more completed groups of touch events includes a complete sequence of touch events starting with a touch event having the event type of a starting type, and ending with a touch event having the event type of an ending type;
- determining, in response to a tap event and according to the plurality of touch events, whether the tap event takes place in a page scrolling process, wherein the tap event is determined to take place in the page scrolling process if a last completed group of touch events before the tap event includes a touch event having the event type of a scroll type; and
- cancelling, in response to a determination that the tap event takes place in the page scrolling process, the tap event,
- wherein the operations further comprise: after forming one or more completed groups of touch events,
  - determining whether a number of completed groups of touch events exceeds N; and
  - deleting, in response to the number of completed groups of touch events exceeds N, all touch events recorded before N latest completed groups of touch events according to the timestamps of the touch events, wherein N is a natural number greater than or equal to 1.

14. The non-transitory computer-readable storage medium of claim 13, wherein the operations further comprise:
- allowing, in response to a determination that the tap event does not take place in the page scrolling process, the tap event to be processed by the mobile terminal.

15. The non-transitory computer-readable storage medium of claim 13, wherein the mobile terminal has a UIWebView browser control.

16. The non-transitory computer-readable storage medium of claim 13, wherein the modifying the event type of the touch event comprises:
- modifying, for a touch event having the event type of a cancellation type, the event type of the touch event to the ending type; and
- modifying, for a touch event having the event type of the scroll type, the event type of the touch event by:
  - determining whether the touch event is global page scrolling or regional page scrolling according to attribute information of the touch event;
  - modifying, in response to the touch event being the global page scrolling, the event type of the touch event to a global scroll type; and
  - modifying, in response to the touch event being the regional page scrolling, the event type of the touch event to a regional scroll type.

17. The non-transitory computer-readable storage medium of claim 16, wherein N equals to 2, and the determining whether the tap event takes place in a page scrolling process comprises:
- determining, in response to a last recorded touch event being the global page scrolling, there being no touch event of the global scroll type between a second-to-last completed group of touch events and a last completed group of touch events, and there being a touch event of the global scroll type in the last completed group of touch events, that the tap event takes place in the page scrolling process; and
- determining, in response to the last recorded touch event being the regional page scrolling, there being no touch event of the regional scroll type in the second-to-last completed group of touch events, and there being a touch event of the regional scroll type in or after the last completed group of touch events, that the tap event takes place in the page scrolling process.

* * * * *